United States Patent
Järvinen et al.

(10) Patent No.: US 7,448,232 B2
(45) Date of Patent: Nov. 11, 2008

(54) CONVECTION HEATING FURNACE FOR A TEMPERED GLASS SHEET

(75) Inventors: Jouko Järvinen, Tampere (FI); Petri Lammi, Tampere (FI); Kari Vähä-Antila, Nokia (FI)

(73) Assignee: Glassrobots OY, Pirkkala (FI)

( * ) Notice: Subject to any disclaimer, the term of this patent is extended or adjusted under 35 U.S.C. 154(b) by 401 days.

(21) Appl. No.: 10/551,387

(22) PCT Filed: Mar. 30, 2004

(86) PCT No.: PCT/FI2004/000182

§ 371 (c)(1),
(2), (4) Date: Sep. 30, 2005

(87) PCT Pub. No.: WO2004/087503

PCT Pub. Date: Oct. 14, 2004

(65) Prior Publication Data

US 2006/0207292 A1    Sep. 21, 2006

(30) Foreign Application Priority Data

Mar. 31, 2003  (FI) ................................. 20030482

(51) Int. Cl.
*C03B 27/00*    (2006.01)

(52) U.S. Cl. ............................. 65/348; 65/349; 65/350; 65/111; 65/114

(58) Field of Classification Search ................... 65/348, 65/349, 350, 351, 29.19, 111, 114
See application file for complete search history.

(56) References Cited

U.S. PATENT DOCUMENTS

| | | | |
|---|---|---|---|
| 5,094,678 A | 3/1992 | Kramer et al. |
| 5,814,789 A | 9/1998 | O'Leary et al. |
| 6,363,752 B1 | 4/2002 | Becker |
| 6,427,488 B1 | 8/2002 | Vitkala et al. |
| 6,470,711 B1 | 10/2002 | Jarvinen et al. |

*Primary Examiner*—Mark Halpern
(74) *Attorney, Agent, or Firm*—Stites & Harbison PLLC; Douglas E. Jackson

(57) ABSTRACT

A convection furnace for a tempered glass sheet (1), into which furnace the glass sheet arrives along a hauling track, as on turning rolls (3), and the furnace has also heating resistances (5) against glass sheet (1) for heating the blast air, a blast apparatus and blast channelling (4), (2) for blasting said air against the glass sheet. The blast channelling comprises elongated channels (2) in the glass sheet (1) direction, inside of which there is at least a part of each blast air heating resistance (5) and each channel (2) has below the resistance line a broadening and in the broadening a bottom part (9), whereby bottom part (9) is furnished with blast holes (7, 8).

10 Claims, 1 Drawing Sheet

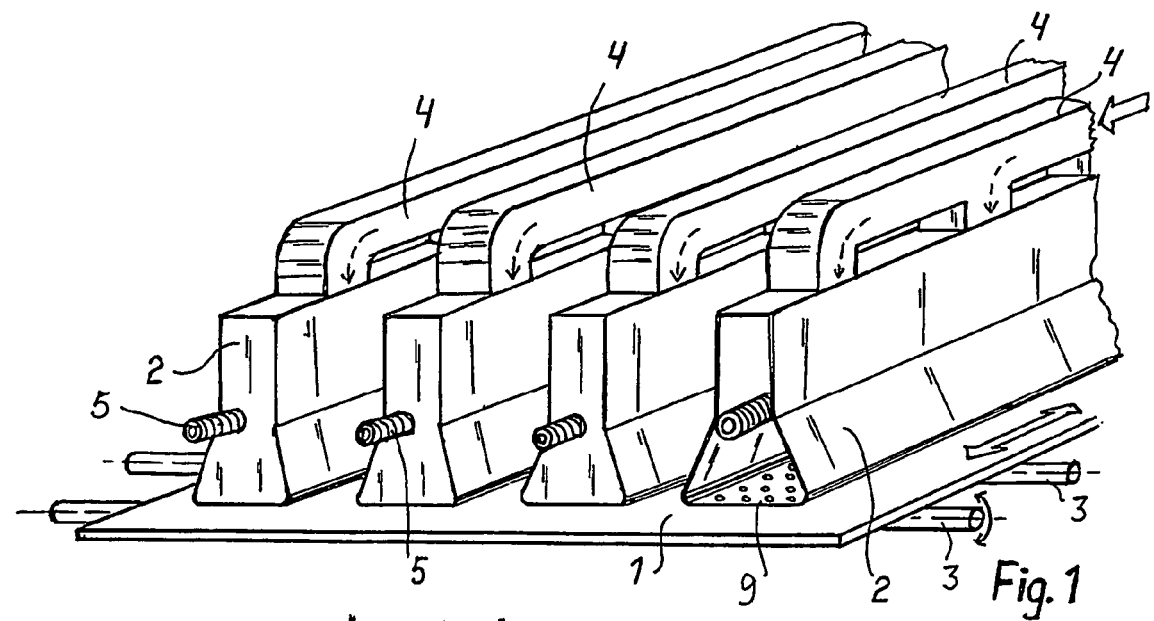
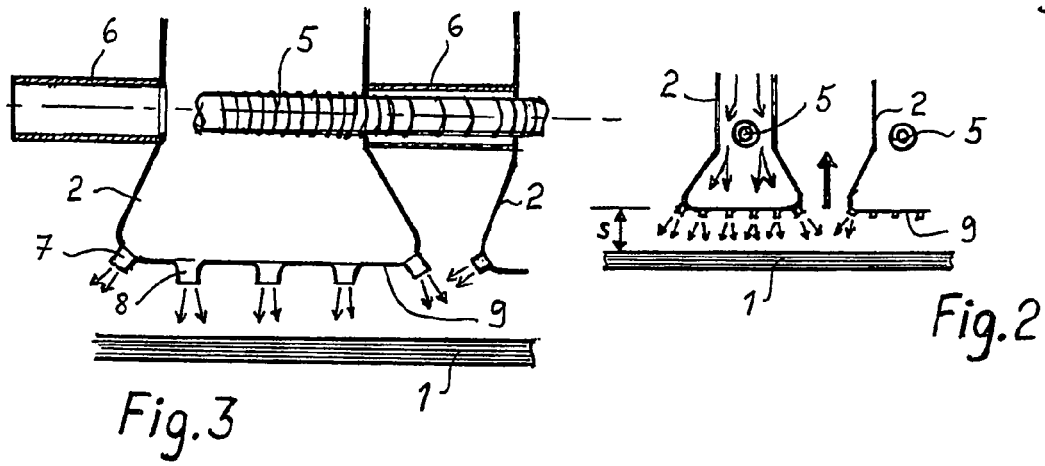

CONVECTION HEATING FURNACE FOR A TEMPERED GLASS SHEET

This application is a 371 of PCT/FI04/00182 filed 30 Mar. 2004.

The invention relates to a convection furnace for a tempered glass sheet, into which furnace the glass sheet arrives along a hauling track, as on turning rolls, further, the furnace has heating resistances against the glass sheet for heating the blast air, a blast apparatus and blast channelling for blasting said air again the glass sheet.

Previously known from Patent specification EPO 0 910 553 B1 is a tempering furnace for glass sheets as per the above preamble, which furnace has elongated air blasting channels. In these channels in the channel direction heating resistances are fitted, which by means of special radiation surfaces are adjusted mainly downwards against the glass. Blast air comes from the upper part of the channels towards radiation canals partly surrounding the heating resistances and the passing channels continue further downwards against special radiation plates furnished with holes. Due to the radiation channels the radiation plates receive strong heat radiation from the heating resistances and, in addition, the radiation plates are deliberately made quite thick plate panels so that the air would have time to get warm on flowing through the holes in them. The air flow does not rinse the heating resistances and so their surface temperature is high and transmits strong heat radiation.

The disadvantage of the above described furnace is that the heating of glass for the most part works as radiation, although even air is blasted, since the radiation plates in the solution are above the glass and considerably in much higher temperature than the temperature of glass. Especially glasses coated in a certain way reflect radiation off and do not get warm by means of radiation heat. In connection with the heat resistances additional radiation canals must be made in the furnace, and below resistances massive radiation plates with openings are still slowly reacting to heat regulation Due to the use of heat resistances as radiation heaters, whereby they have a very high surface temperature, unavoidably results in shorter service life.

In order to eliminate the disadvantages of the above presented furnace solution and to achieve a glass heating shape closer the complete convection heating than before, a new convection heating furnace has been developed, characterized in that the blast channelling comprises elongated channels in the glass direction or fitted at right angles against it, inside of which, at least a part of each heating resistance that heats the blast air is in free connection with the air flow and each channel comprises below the resistance line a broadening and in the broadening a bottom portion, whereby the bottom portion is furnished with blast holes.

The advantage of the invention is that heating takes place almost exclusively by means of convection, whereby the solution is suitable for all kinds of coated glass sheets. The heating resistances are directly in strong air flow, whereby their surface temperature hardly rises much over the blast air temperature. Accordingly, their service life gets longer and the impact of their radiation on the environment remains also small. The air discharge nozzles are holes made in light plate structure. Substantially the plate structure is in the same temperature as the strong air flow led through it, since the radiation of the heating resistances hardly heats the plate structure. Separately adjusted heating resistances can be fitted in the direction of the blast channels or crosswise with respect to them There can also be heating resistances fitted simultaneously into the furnace in both ways.

In the following the invention is disclosed with reference to the enclosed drawing, where FIG. 1 shows a part of the heating furnace, where certain heating components on the glass sheet are shown diagonally from the side.

FIG. 2 shows the blast channel from the end.

FIG. 3 shows the assembly of a heating resistance fitted crosswise with respect to the channel.

FIG. 1 shows a part of the of the glass sheet tempering furnace, comprising walls (not shown) and a hauling track, formed of rotating rolls 3, on which glass sheet 1 can be moved during the process or after it in a way wanted. To lead blast air onto the glass surface, there are in the furnace elongated channels 2, which are in this example fitted in glass sheet 1 direction. The blast air is taken to from one or several blast apparatuses along distribution channellings 4. Placed inside channels 2 are heating elements 5 in channel 2 direction. The channels broaden downward to the under side of heating elements 5 and end on bottoms 9 which have holes. At least the bottom portion is of thin plate and in it holes 7,8 are punched, most suitably so that with the punching tool also collars downward (FIGS. 1-3) around the holes are made. With the thin plate a plate is meant, whose thickness is less than 3 mm.

Heating elements 5 in channel 2 are in relatively strong air flow and the air flow runs closely past elements 5. That is why the elements effectively release heat into the air and the temperature of the elements does not rise very much. The surface temperature in them remains substantially lower than in case of radiation heating, whereby they have to send notable radiation power into the environment. Blast air runs past the resistance, gets warm therefore and continues in warm state through the holes of bottom part 9 towards the glass. Due to the broadened shape of bottom part 9 the coverage area of blast holes 7,8 in the glass surface gets voluminous. Anyhow, between channels 2 sufficient space remains for the air to get back up to the suction face of the blast apparatus.

FIG. 2 shows direct from the channel 2 end the fitting assembly of the channels. The distance of bottom part 9 and glass 1 is adjusted to be about 50-70 mm. bottom part 9 is far from heating element 5, distance about 70-120 mm. Therefore element 5 does hardly heat bottom part 9 through radiation. Bottom part 9 reaches quite close to the blast air temperature. The surface temperature of heating element 5 on its part is formed about 50-300° C. higher than the temperature to which the past flowing air gets heated. The abovementioned difference of temperature depends greatly on the speed by which the air passes elements 5.

FIG. 3 shows an embodiment example, where in channel 2 crosswise direction holes for heating elements 5 are formed and that in the space between channels 2 there are protection bushings 6, adjusting the distance of channels 2 and prevent elements from remarkable radiation out through the spaces between the channels. As to their shape and height channels 2 also allow that there could be simultaneously also elements 5 in the glass direction, fitted both lengthwise and crosswise. The heat power of elements 5 at bushings 6 could be adjusted smaller, e.g. using fewer rotations of the resistance wire towards the unit of length.

Below the glass sheet a heating arrangement as per FIG. 1 can be made turned upside down and most suitably also turned so that channels 2 are in the direction of rolls 3 and in the spaces between them. Blast holes 7 in the corners of bottom parts 9 are then towards rolls 3 and heating them. Also solutions of other kind for heating from the glass sheet under side are possible, for instance ways of heating, where the portion of radiation is greater.

The invention is characterized in that the power of heating can be adjusted to different parts of the glass by means of heating elements 5, which can be separately adjusted. Most suitably elements 5 are side by side in the direction of elements, in other words in the travel direction of the glass, whereby each of them has its own feed and thus individual adjustment is also possible. If necessary, it is possible to get on glass 1 surface the accurate temperature distribution wanted merely by adjusting of the heating elements.

In addition, by means of air distribution channels 4 it is also possible to adjust the speeds of air and distribution of air quantities to different channellings 4 and this way also to influence the distribution of glass temperature. Also by means of general adjustment of the blast apparatuses it is possible to influence the nature of heating, in other words the portion of convection with respect to radiation. A great quantity of air to be blasted and its speed move the way of heating towards almost perfect convection heating.

The invention claimed is:

1. A convection furnace for a tempered glass sheet, comprising:
   a hauling rack along which the glass sheet is directed into the furnace,
   heating resistances which heat air to be blasted against the glass sheet,
   a blast apparatus including blast channelling for blasting the heated air against the glass sheet,
      wherein the blast channelling comprises elongated air channels disposed in the glass sheet direction or at right angles to the glass sheet direction,
      wherein inside of each said air channel there is at least a part of a said blast heating resistance,
      wherein each said elongate air channel includes a narrowest portion in which the at least a part of said heating resistance is located for effecting heat transfer by convection from each heating resistance to the blast air,
      wherein each said air channel has downstream of the narrowest portion a broadening portion, said broadening portion including a bottom part furnished with blast holes through which the heated air is directed onto the glass sheet, and
      wherein said bottom part is made of a thin plate which, due to a strong convection blast of the air and/or a surface quality chosen for said thin plate, transmits substantially little thermal radiation to the adjacent glass sheet.

2. A convection heating furnace according to claim 1, wherein the air blast holes in the bottom part comprise collars made in the thin plate.

3. A convection heating furnace according to claim 1, wherein a temperature difference between a surface temperature of the heating resistances and a temperature of the heated air is no more than 300° C.

4. A convection heating furnace according to claim 1, wherein a temperature difference between a surface temperature of a said heating resistances and a temperature of the heated air is no more than 200° C.

5. A convection heating furnace according to claim 1, wherein the bottom part temperature is substantially the same as the temperature of the blast air on the glass sheet.

6. A convection heating furnace according to claim 1, wherein the heating resistances are located in a respective said channel in the direction of the respective said channel.

7. A convection heating furnace according to claim 1, wherein the heating resistances are located crosswise with respect to said air channels and are led to travel through said air channels.

8. A convection heating furnace according to claim 1, further comprising a separate adjustment mechanism for power to said heating resistances for adjustment of the distribution and rising speed of the class sheet temperature.

9. A convection heating furnace according to claim 1, wherein said narrowest portion of said elongated air channel has a non-diverging cross section in an air flow direction.

10. A convection heating furnace according to claim 9, wherein said narrowest portion of said elongated air channel has a constant cross section in the air flow direction.

* * * * *